United States Patent [19]

Nasgowitz

[11] Patent Number: 4,632,412
[45] Date of Patent: Dec. 30, 1986

[54] COMBINATION HAND TRUCK AND DISPLAY STAND

[75] Inventor: Donald D. Nasgowitz, Milwaukee, Wis.

[73] Assignee: DCI Marketing, Milwaukee, Wis.

[21] Appl. No.: 692,396

[22] Filed: Jan. 18, 1985

[51] Int. Cl.⁴ .............................................. B62B 1/00
[52] U.S. Cl. ................................. 280/47.26; 108/91; 206/507; 211/188
[58] Field of Search ............ 280/639, 47.13 R, 47.18, 280/47.24, 47.25, 47.26, 30, 652; 248/235; 211/128, 186, 188; 108/91, 92, 97, 111; 206/503, 507; 182/20, 33, 33.6, 35, 178

[56] References Cited

U.S. PATENT DOCUMENTS

| | | | |
|---|---|---|---|
| D. 142,952 | 11/1945 | Ford | 211/128 |
| 3,292,942 | 12/1966 | Mitty et al. | 280/47.26 |
| 4,502,741 | 3/1985 | DeVires et al. | 108/111 |

Primary Examiner—John J. Love
Assistant Examiner—Richard Camby

[57] ABSTRACT

A combination hand truck and display stand comprising a lower unit including a generally planar base adapted to rest on a supporting surface, and a pair of generally planar side walls having upper edges and forward edges and extending upwardly from the base, and a portion of the base extending forwardly of the side walls, and an upper unit having a shape substantially identical to the shape of the lower unit and including a generally planar base having a bottom surface, and a pair of generally planar side walls having upper edges and forward edges and extending upwardly from the base, the upper unit being releasably connected to the lower unit such that the bottom surface of the upper unit is supported by the upper edges of the side walls of the lower unit.

20 Claims, 5 Drawing Figures

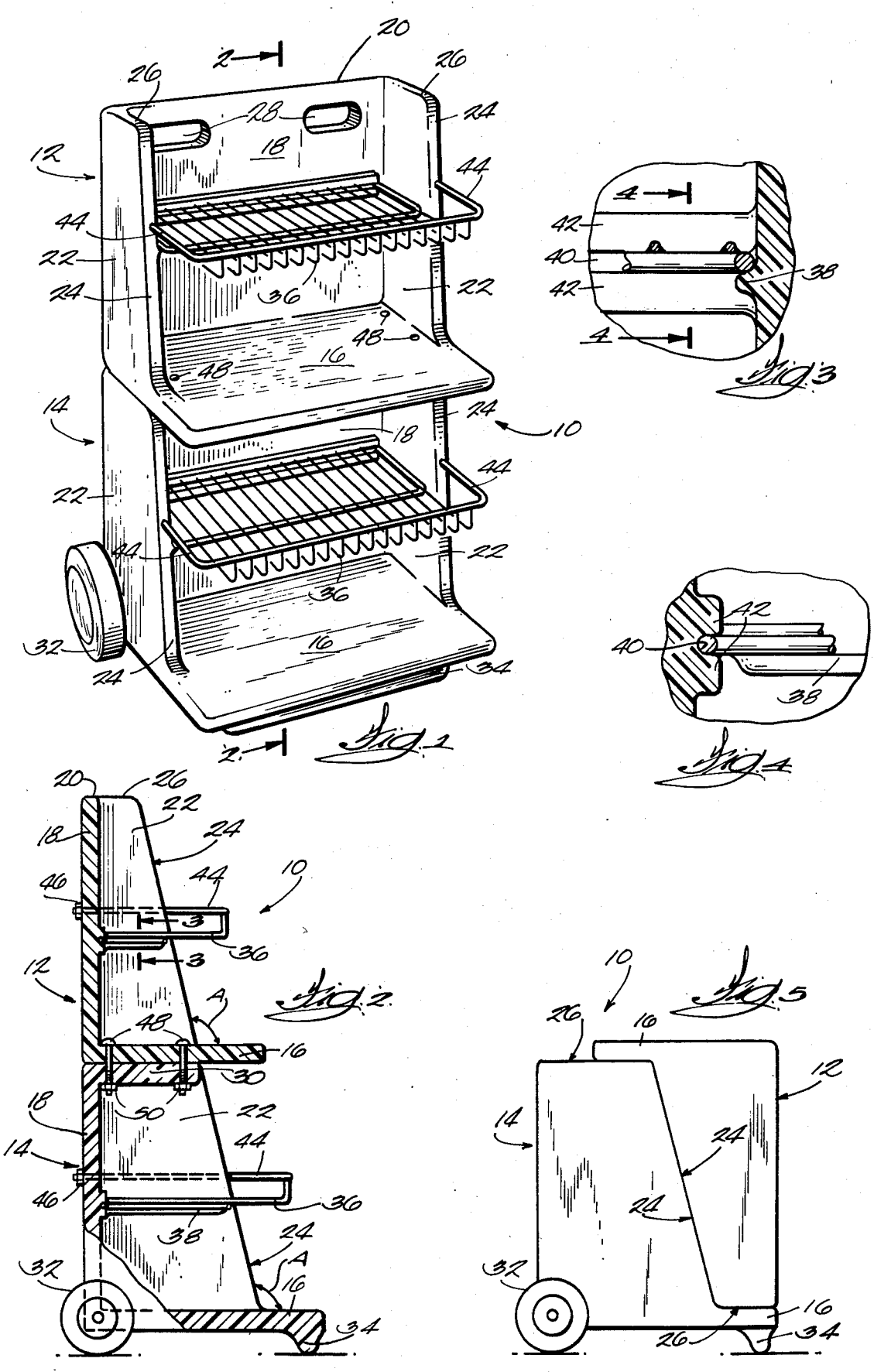

COMBINATION HAND TRUCK AND DISPLAY STAND

BACKGROUND OF THE INVENTION

The invention relates to display apparatus and to hand manipulable apparatus for transporting articles.

SUMMARY OF THE INVENTION

The invention provides a combination hand truck and display stand comprising substantially identical upper and lower units releasably connected to each other such that the upper unit sits on top of the lower unit. The units are constructed such that the upper unit can be inverted and nested with the lower unit to save space for shipping and storage. The assembled apparatus can be used as a hand truck to transport articles, and as a display stand to display merchandise. In a retail setting, the apparatus can be used as a portable display stand.

In the preferred embodiment, each of the units includes a generally planar base, a generally planar rear wall, and a pair of generally planar side walls. A forward portion of the base extends forwardly of the side walls, and the side walls have forward edges that slant rearwardly as they extend upwardly. The lower unit preferably also includes a top wall parallel to the base and integrally connected to the upper edges of the side walls and rear wall, and the bottom surface of the base of the upper unit is releasably connected to the top wall of the lower unit. In the preferred embodiment, the units are connected by bolts extending through the base of the upper unit and the top wall of the lower unit.

To facilitate nesting of the units, the side walls of both units have substantially equal heights, and the upper edges of the side walls of each unit are complementary with the forward portion of the base of the other unit. More specifically, the length of the upper edges of the side walls of the upper unit is substantially equal to the length of the forward portion of the base of the lower unit, i.e., the distance from the forward edges of the side walls to the forward edge of the base.

In the preferred embodiment, each of the upper and lower units further includes a shelf removably mounted parallel to and spaced apart from the base. Also, in the preferred embodiment, the lower unit includes a pair of wheels rotatably mounted for rotation about a generally horizontal axis, and a supporting member extending integrally from the bottom surface of the forward portion of the base. Furthermore, the upper unit preferably includes an opening or openings in the upper end of the rear wall to facilitate hand manipulation of the apparatus.

Other features and advantages of the invention will become apparent to those skilled in the art upon review of the following detailed description, claims, and drawings.

DESCRIPTION OF THE DRAWINGS

FIG. 1 is a perspective view of a combination hand truck and display stand embodying the invention.

FIG. 2 is a cross-sectional view of the combination hand truck and display stand taken along line 2—2 in FIG. 1.

FIG. 3 is a cross-sectional view taken along line 3—3 in FIG. 2.

FIG. 4 is a cross-sectional view taken along line 4—4 in FIG. 3.

FIG. 5 is a side view of the combination hand truck and display stand with the upper and lower units nested.

Before explaining one embodiment of the invention in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

An apparatus 10 embodying the invention is illustrated in the drawings. The apparatus 10 is a combination hand truck and display stand comprising an upper unit 12 and a lower unit 14.

In the illustrated construction, the upper unit 12 includes a generally planar base 16 having forward and rearward edges. The upper unit 12 also includes a generally planar rear wall 18 extending upwardly from the rearward edge of the base 16 and having a generally linear upper edge 20, and a pair of generally planar side walls 22 having generally linear forward and upper edges 24 and 26, respectively. The side walls 22 extend upwardly from the rearward portion of the base 16 such that the forward portion of the base 16 extends forwardly of the side walls 22. Preferably, the length of the forward portion of the base 16, i.e., the distance from the forward edges 24 of the side walls 22 to the forward edge of the base 16, substantially equals the length of the upper edges 26 of the side walls 22. In the preferred embodiment, the forward edges 24 of the side walls 22 slant rearwardly as they extend upwardly, as best shown in FIG. 2, and form an angle "A" with the base 16.

Unlike the lower unit 14, the upper unit 12 includes means for facilitating hand manipulation of the apparatus 10. This means preferably includes a pair of openings 28 in the upper end of the rear wall 18.

The lower unit 14 has a shape substantially identical to the shape of the upper unit 12, and parts of the lower unit 14 corresponding to parts of the upper unit 12 have been given the same reference numeral.

The lower unit 14 includes a generally planar base 16 having forward and rearward edges. The lower unit 14 also includes a generally planar rear wall 18 extending upwardly from the rearward edge of the base 16 and a pair of generally planar side walls 22 having generally linear forward edges 24. The side walls 22 of the lower unit 14 have a height substantially equal to the height of the side walls 22 of the upper unit 12. The side walls 22 extend upwardly from the rearward portion of the base 16 such that the forward portion of the base 16 extends forwardly of the side walls 22. Preferably, the length of the forward portion of the base 16 of the lower unit 14, i.e., the distance from the forward edges 24 of the side walls 22 to the forward edge of the base 16, substantially equals the length of the upper edges 26 of the side walls 22 of the upper unit 12. In the preferred embodiment, the forward edges 24 of the side walls 22 slant rearwardly as they extend upwardly, as best shown in FIG. 2, and form an angle "A" (substantially equal to the angle "A" of the upper unit 12) with the base 16. The forward edges 24 of the side walls 22 of the upper and lower units 12 and 14 are in linear alignment.

Unlike the upper unit 12, the lower unit 14 preferably includes a top wall 30 (see FIG. 2) parallel to the base 16 and integrally connected to the upper portions of the rear wall 18 and of the side walls 22. Preferably, the lower unit 14 also includes means for supporting the apparatus 10 for movement over a supporting surface, and this supporting means preferably includes a pair of wheels 32 rotatably mounted on the lower unit 14 adjacent the rearward edge of the base 16 for rotation about a generally horizontal axis. The lower unit 14 preferably further includes a supporting member 34 extending integrally from the bottom surface of the forward portion of the base 16. The supporting member 34 and wheels 32 support the apparatus 10 such that the base 16 of the lower unit 14 is horizontal.

In the preferred embodiment, each of the upper and lower units 12 and 14 further includes a shelf 36 removably mounted in a position parallel to and spaced apart from the base 16 of the respective unit. The shelf 36 has opposite side edges and a rear edge, and the means for removably mounting the shelf 36 includes a ridge 38 (see FIGS. 2-4) extending generally parallel to the base 16 along the inner surface of each of the side walls 22 for supporting the side edges of the shelf 36, and a groove 40 (see FIGS. 2-4) extending generally parallel to the base 16 along the inner surface of the rear wall 18 for receiving the rear edge of the shelf 36. Actually, in the illustrated construction, the groove 40 is formed by two parallel and closely spaced apart ridges 42 (see FIGS. 3 and 4) extending along the rear wall 18. As best shown in FIGS. 1 and 2, the shelf 36 extends forwardly of the side walls 22 and has a length substantially equal to the length of the base 16. The shelf 36 preferably further includes a pair of rods 44 extending rearwardly from the front of the shelf 36 along each of the side edges and being received in bores in the side walls 22. As best shown in FIG. 2, the rods 44 extend through the side walls 22 and out the rear of the unit, and the ends of the rods 44 are threaded and receive nuts 46 for securing the shelf 36 in place.

The apparatus 10 also comprises means for releasably connecting the upper unit 12 to the lower unit 14. This means preferably includes means for connecting the base 16 of the upper unit 12 to the top wall 30 of the lower unit 14. In the illustrated construction, this means includes a plurality of bolts 48 extending through the base 16 of the upper unit 12 and the top wall 30 of the lower unit 14 and receiving nuts 50, as best shown in FIGS. 1 and 2.

For shipping and storage, the apparatus 10 can be disassembled and the upper and lower units 12 and 14 can be nested as shown in FIG. 5. Because the upper and lower units 12 and 14 have substantially identical constructions, the upper edges 26 of the side walls 22 of the upper unit 12 are complementary with the forward portion of the base 16 of the lower unit 14, and the forward portion of the base 16 of the upper unit 12 is complementary with the upper edges 26 of the side walls 22 of the lower unit 14. With the units nested as shown in FIG. 5, the apparatus 10 occupies significantly less space than when it is assembled. The shelves 36 can be stored inside the units when they are nested.

Various of the features of the invention are set forth in the following claims.

I claim:

1. A combination hand truck and display stand comprising a lower unit including a generally planar base, a generally planar rear wall extending upwardly from said base and having an upper edge, a pair of generally planar side walls extending upwardly from said base and having upper edges and forward edges, a portion of said lower unit base extending forwardly of said lower unit side walls, a top wall parallel to said base and integrally connected to said upper edges of said side walls and of said rear wall, and means for supporting said hand truck and display stand for movement over a supporting surface, an upper unit including a generally planar base, a generally planar rear wall extending upwardly from said base, a pair of generally planar side walls extending upwardly from said base and having upper edges and forward edges, a portion of said upper unit base extending forwardly of said upper unit side walls, and means for facilitating hand manipulation of said hand truck and display stand, and means for releasably connecting said upper unit to said lower unit such that said base of said upper unit is supported by said top wall of said lower unit, said upper and lower units being constructed such that said upper unit can be inverted and nested with said lower unit with said upper edges of said upper unit side walls mating with said forwardly extending portion of said lower unit base, with said forward edges of said lower unit side walls mating with said forward edges of said upper unit side walls, and with the forwardly extending portion of said upper unit base mating with said upper edges of said lower unit side walls.

2. A combination hand truck and display stand as set forth in claim 1 wherein each of said upper and lower units further includes a shelf, and means for removably mounting said shelf in a position parallel to and spaced apart from said base.

3. A combination hand truck and display stand as set forth in claim 2 wherein said shelf has opposite side edges and a rear edge, and wherein said means for removably mounting said shelf includes a ridge extending generally parallel to said base along the inner surface of each of said side walls for supporting said side edges of said shelf, and a groove extending generally parallel to said base along the inner surface of said rear wall for receiving said rear edge of said shelf.

4. A combination hand truck and display stand as set forth in claim 1 wherein said lower unit base has a rear edge, and wherein said means for supporting includes a pair of wheels rotatably mounted on said lower unit near said rear edge of said base for rotation about a generally horizontal axis.

5. A combination hand truck and display stand as set forth in claim 1 wherein said means for releasably connecting said upper unit to said lower unit includes means for releasably connecting said base of said upper unit to said top wall of said lower unit.

6. A combination hand truck and display stand as set forth in claim 1 wherein said upper unit rear wall has an upper edge, and wherein said means for facilitating hand manipulation includes a pair of hand openings in said upper unit rear wall near said upper edge of said upper unit rear wall.

7. A display stand comprising a lower unit including a generally planar base adapted to rest on a supporting surface and having forward and rearward positions, a generally planar rear wall extending upwardly from said base and having an upper edge, and a pair of generally planar side walls having upper edges and forward edges and extending upwardly from said rearward portion of said base such that said forward portion of said base extends forwardly of said side walls.

an upper unit including a generally planar base having forward and rearward portions and a bottom surface, a generally planar rear wall extending upwardly from said base and having an upper edge, and a pair of generally planar side walls having upper edges and forward edges and extending upwardly from said rearward portion of said base such that said forward portion of said base extends forwardly of said side walls, and means for releasably connecting said upper unit to said lower unit such that said bottom surface of said base to said upper unit is supported by said upper edges of said side walls and said upper edge of said rear wall of said lower unit, said upper and lower units being constructed such that said upper unit can be inverted and nested with said lower unit with said upper edges of said side walls and of said rear wall of said upper unit mating with said forward portion of said base of said lower unit, with said forward edges of said side walls of said lower unit mating with said forward edges of said side walls of said upper unit, and with said forward portion of said base of said upper unit mating with said upper edges of said side walls and of said rear wall of said lower unit.

8. A display stand as set forth in claim 7 wherein said upper edges of said side walls of said upper unit are complementary with said forward portion of said base of said lower unit.

9. A display stand as set forth in claim 7 wherein each of said upper and lower units further includes a shelf, and means for removably mounting said shelf in a position parallel to and spaced apart from said base.

10. A display stand as set forth in claim 9 wherein said shelf has opposite side edges and a rear edge, and wherein said means for removably mounting said shelf includes a ridge extending generally parallel to said base along the inner surface of each of said side walls for supporting said side edges of said shelf, and a groove extending generally parallel to said base along the inner surface of said rear wall for receiving said rear edge of said shelf.

11. A display stand as set forth in claim 7 wherein said lower unit further includes means for supporting said lower unit on a supporting surface.

12. A display stand as set forth in claim 11 wherein said means for supporting said lower unit includes a pair of wheels rotatably mounted on said lower unit for rotation about a generally horizontal axis.

13. A display stand as set forth in claim 7 wherein said lower unit further includes a top wall parallel to said base and integrally connected to said upper edges of said side walls and of said rear wall, and wherein said means for releasably connecting said upper unit to said lower unit includes means for releasably connecting said base of said upper unit to said top wall of said lower unit.

14. A display stand comprising
a lower unit including a generally planar base adapted to rest on a supporting surface, and a pair of generally planar side walls extending upwardly from said base and having a height, said side walls having upper edges and forward edges, a portion of said base extending forwardly of said side walls by a certain length, an upper unit including a generally planar base having a bottom surface, and a pair of generally planar side walls extending upwardly from said base and having a height substantially equal to the height of said side walls of said lower unit, said upper unit side walls having forward edges and upper edges having a length substantially equal to the length of said forwardly extending portion of said lower unit base, and means for releasably connecting said upper unit to said lower unit such that said bottom surface of said upper unit base is supported by said upper edges of said lower unit side walls, said upper and lower units being constructed such that said upper unit can be inverted and nested with said lower unit with said upper edges of said upper unit side walls mating with said forwardly extending portion of said lower unit base, with said forward edges of said lower unit side walls mating with said forward edges of said upper unit side walls, and with said forwardly extending portion of said upper unit base mating with said upper edges of said lower unit side walls.

15. A display stand as set forth in claim 14 wherein each of said upper and lower units further includes a shelf, and means for removably mounting said shelf in a position parallel to and spaced apart from said base.

16. A display stand as set forth in claim 15 wherein said shelf has opposite side edges and a rear edge, and wherein said means for removably mounting said shelf includes a ridge extending generally parallel to said base along the inner surface of each of said side walls for supporting said side edges of said shelf.

17. A display stand as set forth in claim 14 wherein said lower unit further includes means for supporting said lower unit on a supporting surface.

18. A display stand as set forth in claim 17 wherein said means for supporting said lower unit includes a pair of wheels rotatably mounted on said lower unit for rotation about a generally horizontal axis.

19. A display stand as set forth in claim 14 wherein said lower unit further includes a top wall parallel to said base and integrally connected to said upper edges of said side walls, and wherein said means for releasably connecting said upper unit to said lower unit includes means for releasably connecting said base of said upper unit to said top wall of said lower unit.

20. A display stand as set forth in claim 14 wherein said forward edges of said lower unit side walls extend upwardly and rearwardly from said lower unit base and form and angle therewith, and wherein said forward edges of said upper unit side walls extend upwardly and rearwardly from said upper unit base and form an angle therewith substantially equal to said angle of said lower unit.

* * * * *